United States Patent
Zhang (10) Patent No.: US 10,992,821 B2
(45) Date of Patent: Apr. 27, 2021

(54) VIBRATION METHOD, MOBILE TERMINAL, AND COMPUTER-READABLE STORAGE MEDIUM

(71) Applicant: AAC Technologies Pte. Ltd., Singapore (SG)

(72) Inventor: Yulei Zhang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/528,699

(22) Filed: Aug. 1, 2019

(65) Prior Publication Data
US 2020/0053227 A1 Feb. 13, 2020

(30) Foreign Application Priority Data
Aug. 9, 2018 (CN) .......................... 201810901296.2

(51) Int. Cl.
*H04M 19/04* (2006.01)
(52) U.S. Cl.
CPC ................. *H04M 19/047* (2013.01)
(58) Field of Classification Search
CPC .............................. G09B 15/003; H04R 1/028
See application file for complete search history.

(56) References Cited

U.S. PATENT DOCUMENTS 8,321,510 B1 * 11/2012 Queru .................... G06F 16/95
709/204

2010/0169493 A1 * 7/2010 Yamakawa ......... H04L 65/1083
709/227
2013/0262118 A1 * 10/2013 Saeki ....................... G06F 3/165
704/260

(Continued)

FOREIGN PATENT DOCUMENTS

CN 105245704 A1 1/2016
JP 2001320447 A1 11/2001
(Continued)

OTHER PUBLICATIONS

Merriam-Webster definition of sound (Year: 2020).*
(Continued)

*Primary Examiner* — Joshua L Schwartz
(74) *Attorney, Agent, or Firm* — W&G Law Group LLP (57) ABSTRACT

Embodiments of the present disclosure relate to the field of communication technology, and disclose a vibration method, a mobile terminal, and a computer-readable medium. A corresponding relation between music parameters and vibration signals is pre-stored in the mobile terminal. The vibration method is applied to a mobile terminal and includes: acquiring, according to the a preset ringtone, a music parameter of the ringtone; searching for a vibration signal corresponding to the music parameter according to the music parameter of the ringtone; generating a driving signal matching the ringtone according to the found vibration signal, where the driving signal is used to drive a motor inside the mobile terminal to produce a vibration matching the ringtone; and when the ringtone is played, driving the motor to vibrate according to the generated driving signal. In this way, the mobile terminal vibrates according to the rhythm of music, meeting users' personalized requirements.

9 Claims, 4 Drawing Sheets

(56) References Cited

U.S. PATENT DOCUMENTS

2016/0303344 A1* 10/2016 Smudde ................ A61M 21/02
2018/0137770 A1* 5/2018 Whisenant ........... G09B 15/003

FOREIGN PATENT DOCUMENTS

| JP | 2002016672 A1 | 1/2002 |
| JP | 2002252676 A1 | 9/2002 |

OTHER PUBLICATIONS

Notice of Reasons for Refusal dated Nov. 12, 2019 by JPO in related Japanese Patent Application No. 2019-133215 (9 Pages).
1st Office Action dated Mar. 19, 2020 by SIPO in related Chinese Patent Application No. 201810901296.2 (15 Pages).

* cited by examiner

VIBRATION METHOD, MOBILE TERMINAL, AND COMPUTER-READABLE STORAGE MEDIUM

TECHNICAL HELD

Embodiments of the present disclosure relate to the field of communication technology, and in particular, to a vibration method, a mobile terminal, and a computer-readable storage medium.

BACKGROUND

With the improvement of living standards, people are having more personalized requirement on ringtones of mobile phones. Ringtones are expected to be pleasant to ears and provide different tactile feelings. A mobile phone can vibrate while playing a ringtone, which somewhat meets people's needs for tactile feelings.

However, the inventor of the present disclosure finds that in the prior art, all mobile phones vibrate in the same boring manner, and cannot be distinguished according to vibrations thereof. The vibration lacks the rhythm of music, and cannot meet users' personalized requirements.

DETAILED DESCRIPTION

To make the objectives, technical solutions, and advantages of the embodiments of the present disclosure clearer, the following further describes embodiments of the present disclosure in detail with reference to the accompanying drawings. However, those of ordinary skill in the art may understand that, in the various embodiments of the present disclosure, numerous technical details are set forth to provide the reader with a better understanding of the present disclosure. However, the technical solutions claimed in the present disclosure can further be implemented without these technical details and various changes and modifications based on the following embodiments.

A first embodiment of the present disclosure relates to a vibration method. The core of this embodiment is: acquiring, according to a preset ringtone, a music parameter of the ringtone; searching for a vibration signal corresponding to the music parameter according to the music parameter of the ringtone; generating a driving signal matching the ringtone according to the found vibration signal, and the driving signal is used to drive a motor inside the mobile terminal to produce a vibration matching the ringtone; and when the ringtone is played, driving the motor to vibrate according to the generated driving signal. Details of the motor driving method of this embodiment will be specifically described below. The following content is merely implementation details provided for convenience of understanding, but not necessary for implementing this solution.

Figure 1:
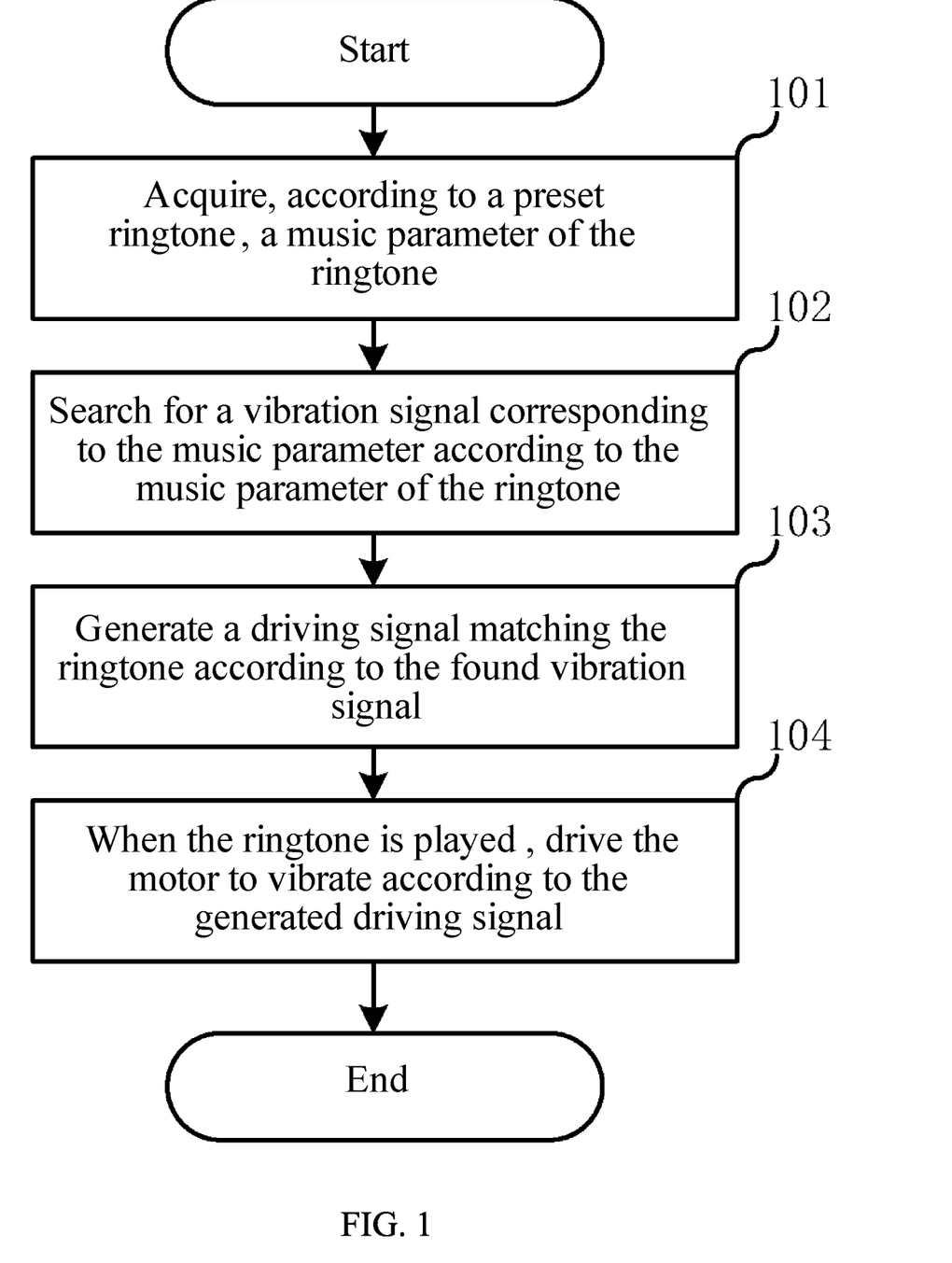
FIG. 1 is a schematic flowchart of a vibration method according to a first embodiment of the present disclosure.

The vibration method in this embodiment is applied to a mobile terminal, and the mobile terminal is pre-stored with a corresponding relation between music parameters and vibration signals. Different vibration signals correspond to different music parameters and have different vibration effects, and different vibrations can be produced by combining different vibration signals. A vibration signal corresponding to a music parameter can produce a personalized musical vibration. FIG. 1 is a schematic flowchart of the vibration method in this embodiment, specifically including the following steps:

Step 101: Acquire, according to a preset ringtone, a music parameter of the ringtone.

Specifically, the preset ringtone may be a music set by a user according to preferences. The ringtone may be a incoming call ringtone, a incoming message ringtone, an alarm clock ringtone and other ringtones commonly used to remind users. A mobile terminal acquires, according to the preset ringtone, the music parameter of the ringtone. The mobile terminal may be a smart device such as a mobile phone or a tablet computer. In this embodiment, the mobile phone is used as an example, but in practical applications, the present disclosure is not limited thereto. The music parameter may be a parameter representing musical characteristics, for example, a music beat, a music speed, a music spectrum, or a music amplitude. For example, a mobile phone may query the network side for a preset ringtone, and acquire a music parameter related to the preset ringtone.

Step 102: Search for a vibration signal corresponding to the music parameter according to the music parameter of the ringtone.

Specifically, the vibration signal may have a strength parameter and a signal interval, which can be used to represent the strength of the vibration and the length of the interval at which the vibration is generated each time. The strength parameter may be a vibration time length and/or a vibration amplitude. When the vibration amplitude cannot be increased, increasing the vibration time length of the vibration signal makes the user have a feeling that as if the strength of the signal is increased. For ringtone vibration, as the ringtone notification requires a high strength, the vibration signal can be played at a maximum amplitude, and only the time length of the vibration signal is adjusted. According to the music beat and the strength of the notes in the music parameters, the vibration time length corresponding to the ringtone is acquired. Because the music beat is used to represent a combination rule of strong and weak beats, different signal lengths may be acquired through different music beats. For example, the music beat is 4/4 beat, 4/4 beat counts a quarter note as one beat, each bar includes four beats and may include four quarter notes, namely, strong, weak, less strong, weak. In this case, different signal lengths can be acquired based on the strength of each beat. The strong beat has the largest signal length, the less strong beat has the second largest signal length, and the weak beat has the smallest signal length or has a signal length of 0. According to the music speed, the signal interval corresponding to the ringtone is acquired. The music speed is used to measure the rhythm of music, that is, beats per minute (BPM). A larger BPM indicates a faster rhythm. For example, a faster rhythm indicates a shorter signal interval and a higher vibration frequency; a slower rhythm indicates a longer signal interval and a lower vibration frequency.

In addition, the acquiring strength parameters of the vibration signal corresponding to the ringtone according to the music beat may be: acquiring sound signal strengths of the ringtone at different moments according to the music beat; and acquiring the vibration time length and/or the vibration amplitude of the vibration signal according to the sound signal strengths. The acquiring a signal interval of the vibration signal corresponding to the ringtone according to the music speed is specifically: acquiring signal intervals corresponding to the ringtone at different moments according to the music speed. The signal interval is equal to the interval of each beat minus the length of the signal. The music speed may be expressed by beats per minute (BPM). A larger BPM indicates a higher music speed and a shorter signal interval. A smaller BPM indicates a lower music speed and a longer signal interval.

Step 103: Generate a driving signal matching the ringtone according to the found vibration signal.

Specifically, according to a preferred time length range of each vibration, a preset vibration signal having a determined length may be identified and found. The vibration matching the ringtone may be produced after different vibration signals are combined at a certain time interval, and matches the beats of the ringtone during playing, thereby achieving a vibration matching the music ringtone. If the speed of the same music ringtone changes, the combination of signals may change accordingly. For example, signal intervals determined according to different music speeds may influence the length and interval of the driving signal.

In a practical application, the driving signal matching the ringtone may also be generated by the following method: the mobile terminal may store a first corresponding relation between preset music parameters and expected vibrations, and different music parameters directly correspond to different expected vibrations, so that the mobile terminal may search, in the pre-stored first corresponding relation according to the music parameter of the preset ringtone, for an expected vibration matching the ringtone. The mobile terminal may also store a second corresponding relation between preset expected vibrations and driving signals, and different expected vibrations directly correspond to different driving signals. The driving signal matching the ringtone can be acquired more easily and directly, so that when the motor vibrates according to the generated driving signal, a vibration matching the ringtone can be produced more easily, thereby improving user experience.

Step 104: When the ringtone is played, drive the motor to vibrate according to the generated driving signal.

Specifically, the motor disposed in the mobile terminal is driven by a driving signal. A waveform of the driving signal directly determines the vibration effect of the motor, and different driving signals produce different vibration effects. When the ringtone is played, the motor may be driven to vibrate according to the generated driving signal, so that the motor may produce the vibration effect matching the ringtone when vibrating. For example, when a mobile phone is playing a ringtone, the motor in the mobile phone vibrates rhythmically along with the rhythm of the ringtone.

It should be noted that if the incoming call ringtone is changed, the mobile terminal may automatically update the driving signal after detecting the change, so that when the mobile terminal plays the incoming call ringtone, the motor can be driven to vibrate in time according to the updated driving signal, improving user experience.

It should be noted that if the mobile phone is set to a vibration mode and receives an incoming call, no music is played, but the motor is driven to vibrate according to the driving signal, so as to produce a rhythmic, musical vibration, so that mobile phones can be distinguished according to vibrations.

Compared with the prior art, in this embodiment of the present disclosure, according to a preset ringtone, a music parameter of the ringtone is acquired. The music parameter of the ringtone helps reflect the music characteristics of the ringtone. Because the ringtone is preset, users' needs can be met. When the ringtone is played, the vibration generated by the motor in the mobile terminal matches the preset ringtone so that the vibration perceived by the user is no longer boring, but is as musical as the ringtone, thereby improving user experience and meeting users' personalized requirements. In addition, because motors in mobile terminals no longer vibrate in the same manner, different users can be distinguished according to the vibrations that match the ringtones.

A second embodiment of the present disclosure relates to a vibration method. The second embodiment is an improvement based on the first embodiment. The improvement lies in that in this embodiment of the present disclosure, the generating a driving signal matching the ringtone according to the found vibration signal is specifically: combining the found N vibration signals to generate the driving signal matching the ringtone.

Figure 2:
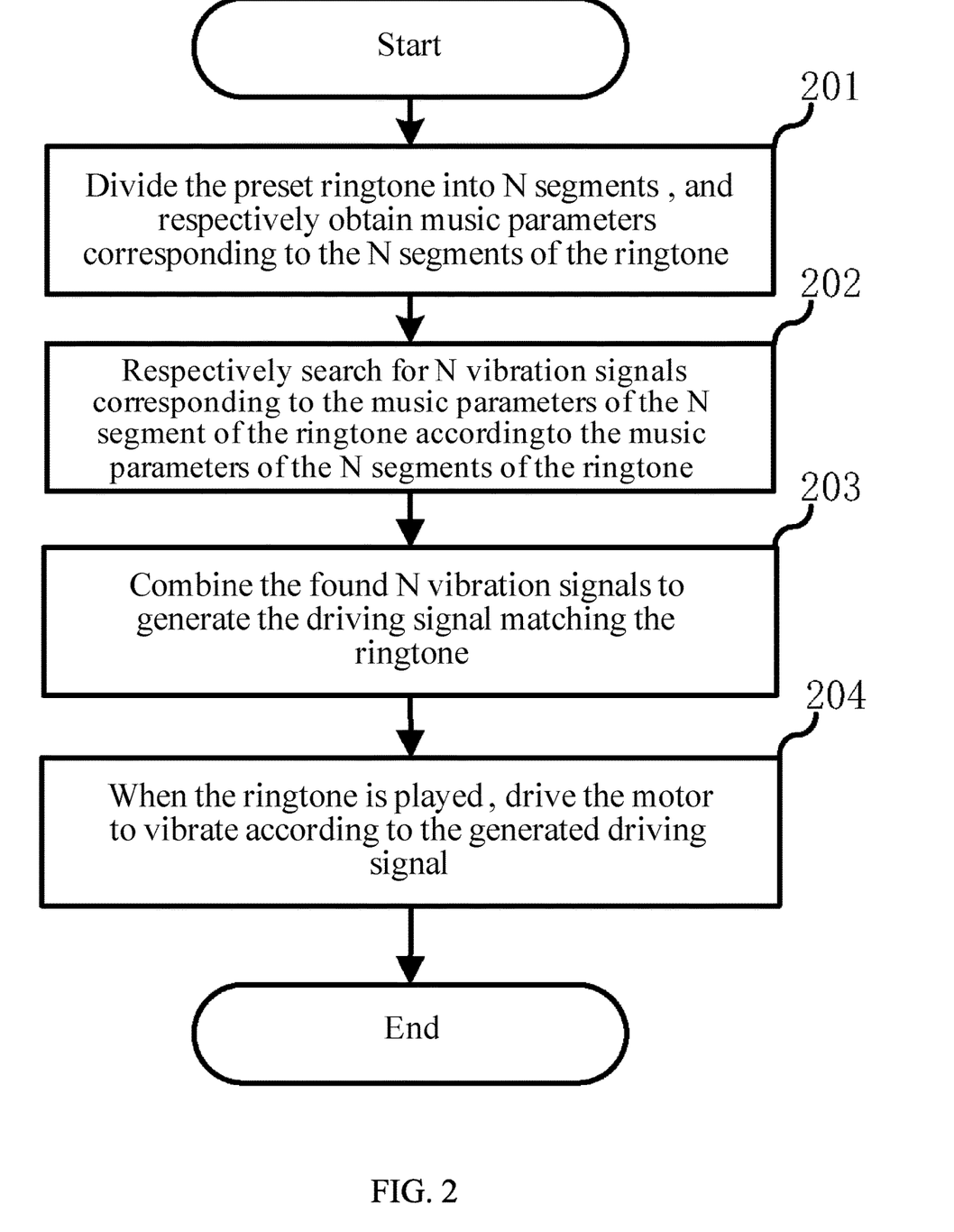
FIG. 2 is a schematic flowchart of a vibration method according to a second embodiment of the present disclosure.

FIG. 2 is a schematic flowchart of the vibration method in this embodiment, specifically including the following steps:

Step 201: Divide the preset ringtone into N segments, and respectively obtain music parameters corresponding to the N segments of the ringtone.

For example, if the preset ringtone is 1 minute long, the preset ringtone may be divided into 10 segments each having a length of 6 seconds. Music parameters corresponding to the segments of the ringtone are acquired. The music parameters of the segments of the ringtone may be the same or different. In this embodiment, the division of the preset ringtone into 10 segments is merely used as an example, but in practical applications, the present disclosure is not limited thereto.

Step 202: Respectively search for N vibration signals corresponding to the music parameters of the N segment of the ringtone according to the music parameters of the N segments of the ringtone.

Specifically, because the corresponding relation between the music parameters and the vibration signal is pre-stored in the mobile terminal, the vibration signal corresponding to the music parameter of each segment of the ringtone can be found directly according to the corresponding relation.

Step 203: Combine the found N vibration signals to generate the driving signal matching the ringtone.

Specifically, the vibration signal may be any signal waveform such as a sine wave, and the different vibration signals may be waveforms having different amplitudes and frequencies. The found N vibration signals may be combined according to an order in which the preset ringtone is segmented. For example, the preset ringtone is divided into two segments, a first segment corresponding to a first vibration signal and a second segment corresponding to a second vibration signal, the vibration signals may be combined in such a manner that the first vibration signal is prior to the second vibration signal. The generated driving signal matching the ringtone may be a combination of the first vibration signal and the second vibration signal.

Step 204: When the ringtone is played, drive the motor to vibrate according to the generated driving signal.

Step 204 is basically the same as step 104 in the first embodiment, and to avoid repetition, the details will not be described herein again.

Compared with the prior art, in this embodiment, the ringtone is divided into segments and vibrations signals corresponding to the segments of the ringtone are combined, so that the driving signal matching the ringtone can be generated more simply and scientifically, and the vibration matching each segment of the ringtone can be produced, thereby improving the matching degree between the entire ringtone and vibrations, and further enhancing the rhythm of vibrations.

A third embodiment of the present disclosure relates to a vibration method. This embodiment is an improvement based on the second embodiment. The improvement lies in that in this embodiment, the combining the found N vibration signals to generate the driving signal matching the ringtone specifically includes: acquiring play time points of the N vibration signals; and combining the found N vibration signals according to the play time points of the N vibration signals, to generate the driving signal matching the ringtone.

Figure 3:
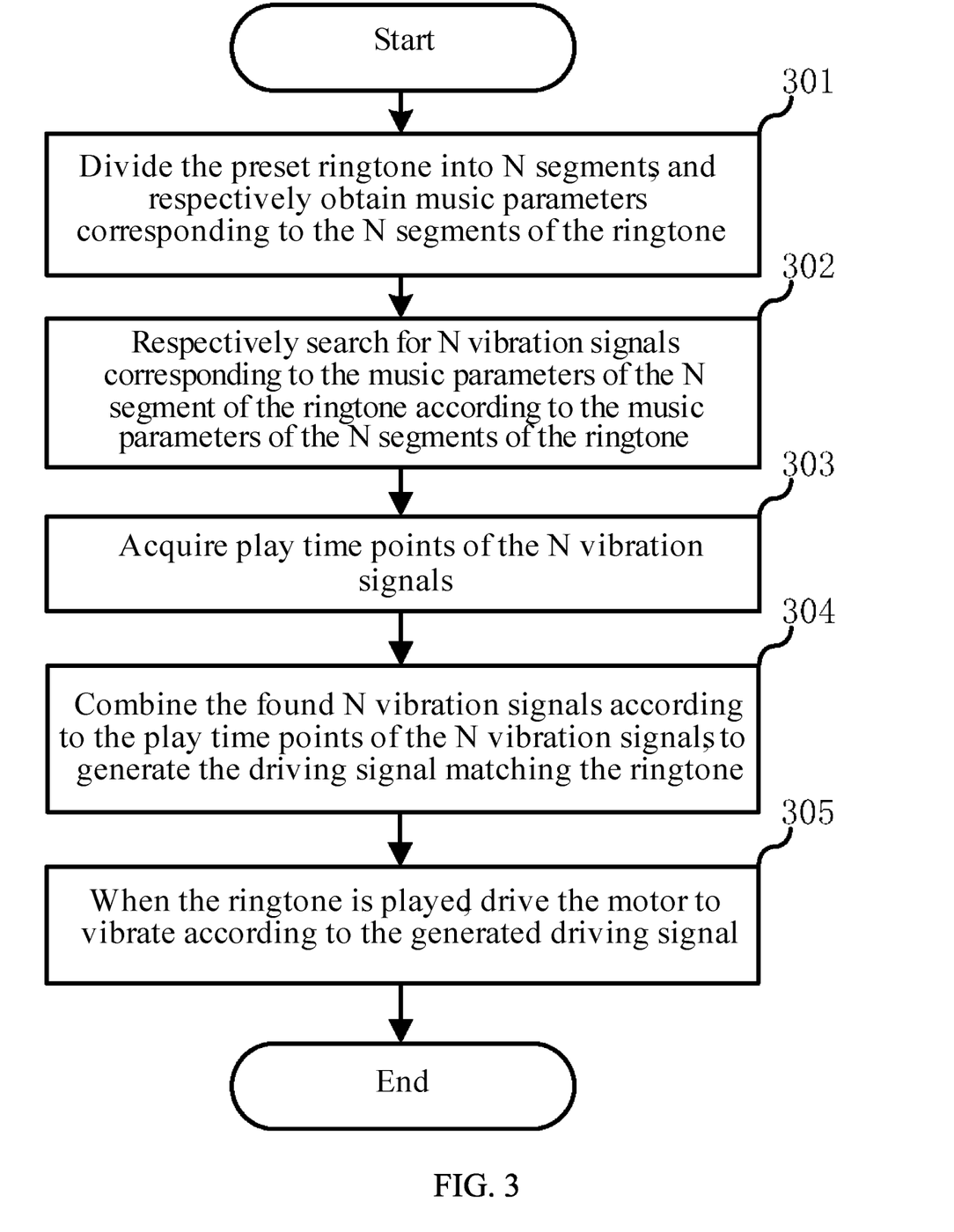
FIG. 3 is a schematic flowchart of a vibration method according to a third embodiment of the present disclosure.

FIG. 3 is a schematic flowchart of the vibration method in this embodiment, specifically including the following steps:

Step 301: Divide the preset ringtone into N segments, and respectively obtain music parameters corresponding to the N segments of the ringtone.

Step 302: Respectively search for N vibration signals corresponding to the music parameters of the N segment of the ringtone according to the music parameters of the N segments of the ringtone.

Step 303: Acquire play time points of the N vibration signals.

Specifically, the play time points of the vibration signals may be acquired based on the music beat and the music speed. For example, in a 4/4 beat music, the 4/4 beat rhythm type may be used. The 4/4 beat rhythm type may be set to "1-2,2", where "1--" represents a long vibration signal, with its vibration time plus the interval being equal to two beats; "2" represents a short vibration signal, with its vibration time plus the interval being equal to one beat. "2,2" means that the short vibration signal is repeated once. The three signals add up to four beats, equal to the quantity of beats in one bar of music. When the music speed is 100 bpm, one beat is 0.6 s. If the vibration time length of the signal "1--" is 20 ms, the interval is 0.6-0.02+0.6=1.18 s. Similarly, if the music speed changes to 150 bpm, one beat is 0.4 s. If the vibration of the signal "1--" remains unchanged, the interval should be adjusted to 0.4−0.02+0.4=0.78 s. It should be noted that the beat which remains unchanged may also be applied to other vibrations having the same beat but different rhythmic types. Since different vibration signals can represent different vibration time lengths and intervals, the play time points of the adjusted basic vibration signal may be acquired according to vibration time lengths and intervals of different signals acquired. For example, a first vibration signal corresponds to a vibration time length of 0.02 s and an interval length of 1.18 s, indicating that after vibrating 0.02 s, the motor stops vibrating, and 1.18 s after the motor stops vibrating, the motor starts to vibrate according to a second vibration signal. The second vibration signal corresponds to a vibration time length of 0.02 s and an interval length of 0.78 s. In this case, if the play time point of the first vibration signal is 0.1 s, the play time point of the second vibration signal is 0.1+0.02+1.18=1.3 s. By analogy, the play time points of the different signals can be obtained.

Step 304: Combine the found N vibration signals according to the play time points of the N vibration signals to generate the driving signal matching the ringtone.

Specifically, the play time points of the N vibration signals represent an order in which the N vibration signals are to be played. The found N vibration signals are combined according to the order in which the N vibration signals are to be played, to generate the driving signal matching the ringtone. For example, in step 303, if the play time point of the first vibration signal is 0.1 s and the play time point of the second vibration signal is 1.3 s, the generated driving signal may produce no vibration during the first 0.1 s, the first vibration signal is played at 0.1 s, and the second vibration signal is play at 1.3 s.

Step 305: When the ringtone is played, drive the motor to vibrate according to the generated driving signal.

Step 305 is basically the same as step 204 in the second embodiment, and to avoid repetition, the details will not be described herein again.

Compared with the prior art, in this embodiment of the present disclosure, the found N vibration signals are combined according to the play time points of the N vibration signals to generate the driving signal matching the ringtone, so that the driving signal matching the ringtone can be generated more simply and scientifically. In this way, when the motor vibrates according to the generated driving signal, a vibration matching the ringtone can be produced more easily.

Figure 4:
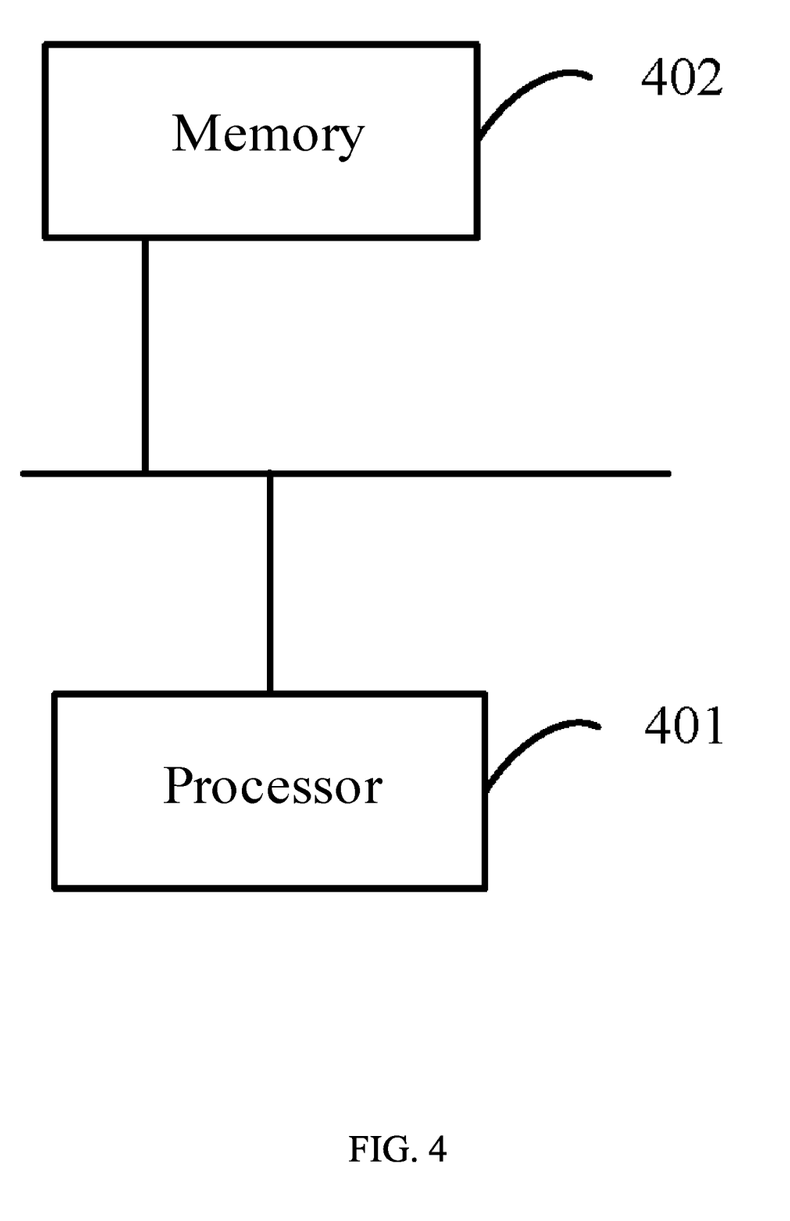
FIG. 4 is a schematic structural diagram of a mobile terminal according to a fourth embodiment of the present disclosure.

A fourth embodiment of the present disclosure relates to a terminal device, as shown in FIG. 4, including at least one processor 401 and a memory 402 communicably connected with the at least one processor 401 for storing instructions executable by the at least one processor 401. Execution of the instructions by the at least one processor 401 causes the at least one processor 401 to perform the vibration method according to the embodiments of the present disclosure.

The memory 402 and the processor 401 are connected by a bus. The bus may include any quantity of interconnected buses and bridges. The bus connects various circuits of the one or more processors 401 and the memory 402. The bus may also connect various other circuits such as a peripheral device, a voltage regulator, and a power management circuit. These are known in the art, and the details are not described herein. A bus interface provides an interface between the bus and a transceiver. The transceiver may be one element or a plurality of elements such as a plurality of receivers and transmitters, and serves as a unit configured to communicate with various other devices over a transmission medium. Data processed by the processor 401 is transmitted over a wireless medium by using an antenna. The antenna further receives data and transmits the data to the processor 401.

The processor 401 is responsible for managing the bus and general processing, and may further provide various functions including timing, peripheral interface, voltage adjustment, power supply management, and other control functions. The memory 402 may be configured to store data used by the processor 401 executing an operation.

A fifth embodiment of the present disclosure relates to a computer-readable storage medium storing a computer program. The foregoing method embodiments may be implemented when the computer program is executed by a processor.

That is, those skilled in the art may understand that all or some of the steps in the methods according to the foregoing embodiments may be implemented by a program instructing relevant hardware. The program is stored in a storage medium and includes instructions used to enable a device (which may be a single-chip microcomputer, a chip, or the like) or a processor to implement all or some of the steps in the methods according to the foregoing embodiments of the present disclosure. The storage medium includes any medium that can store program code, such as a USB flash memory drive, a removable hard disk, a read-only memory (ROM), a random access memory (RAM), a magnetic disk, or an optical disc.

Those of ordinary skill in the art may understand that, the embodiments described above are specific embodiments for implementing the present disclosure, and in actual applications, various changes may be made the forms and details without departing from the spirit and scope of the present disclosure.

What is claimed is:

1. A vibration method, applied to a mobile terminal, wherein a corresponding relation between music parameters and vibration signals is pre-stored in the mobile terminal, the vibration method comprising:

acquiring, according to a preset ringtone, a music parameter of the ringtone;

searching for a vibration signal corresponding to the music parameter according to the music parameter of the ringtone;

generating a driving signal matching the ringtone according to the found vibration signal, wherein the driving signal is used to drive a motor inside the mobile terminal to produce a vibration matching the ringtone; and driving the motor to vibrate according to the generated driving signal, when the ringtone is played;

wherein the ringtone is specifically an incoming call ringtone, after detecting that the incoming call ringtone is changed, generating a new driving signal matching the changed incoming call ringtone, wherein the driving the motor to vibrate according to the generated driving signal is specifically: driving the motor to vibrate according to the new driving signal;

wherein the acquiring, according to a preset ringtone, a music parameter of the ringtone is specifically: dividing the preset ringtone into N segments, and respectively obtaining music parameters corresponding to the N segments of the ringtone, wherein N is a natural number greater than 1;

the searching for a vibration signal corresponding to the music parameter according to the music parameter of the ringtone is specifically: respectively searching for N vibration signals corresponding to the music parameters of the N segment of the ringtone according to the music parameters of the N segments of the ringtone; and the generating a driving signal matching the ringtone according to the found vibration signal is specifically: combining the found N vibration signals to generate the driving signal matching the ringtone.

2. The vibration method according to claim 1, wherein the combining the found N vibration signals to generate the driving signal matching the ringtone specifically comprises:

acquiring play time points of the N vibration signals; and combining the found N vibration signals according to the play time points of the N vibration signals to generate the driving signal matching the ringtone.

3. The vibration method according to claim 1, wherein the musical parameters comprise at least a music beat and a music speed; and the searching for a vibration signal corresponding to the music parameter according to the music parameter of the ringtone specifically comprises:

acquiring strength parameters of the vibration signal corresponding to the ringtone according to the music beat, wherein the strength parameters comprise a vibration time length and/or a vibration amplitude;

acquiring a signal interval of the vibration signal corresponding to the ringtone according to the music speed; and searching for the vibration signal corresponding to the music parameter according to the strength parameter and the signal interval.

4. The vibration method according to claim 3, wherein, the acquiring strength parameters of the vibration signal corresponding to the ringtone according to the music beat is specifically: acquiring sound signal strengths of the ringtone at different moments according to the music beat; and acquiring the strength parameters of the vibration signal according to the sound signal strengths; and the acquiring a signal interval of the vibration signal corresponding to the ringtone according to the music speed is specifically: acquiring signal intervals corresponding to the ringtone at different moments according to the music speed.

5. A mobile terminal, comprising:

at least one the processor; and a memory communicably connected with the at least one the processor for storing instructions executable by the at least one processor, wherein execution of the instructions by the at least one processor causes the at least one processor to perform a vibration method, applied to a mobile terminal, wherein a corresponding relation between music parameters and vibration signals is pre-stored in the mobile terminal, the vibration method comprising:

acquiring, according to a preset ringtone, a music parameter of the ringtone;

searching for a vibration signal corresponding to the music parameter according to the music parameter of the ringtone;

generating a driving signal matching the ringtone according to the found vibration signal, wherein the driving signal is used to drive a motor inside the mobile terminal to produce a vibration matching the ringtone; and driving the motor to vibrate according to the generated driving signal, when the ringtone is played;

wherein the at least one processor is caused by the instructions stored in the memory to perform the acquiring, according to a preset ringtone, a music parameter of the ringtone, which specifically comprises: dividing the preset ringtone into N segments, and respectively obtaining music parameters corresponding to the N segments of the ringtone, wherein N is a natural number greater than 1;

wherein the at least one processor is caused by the instructions stored in the memory to perform the searching for a vibration signal corresponding to the music parameter according to the music parameter of the ringtone, which specifically comprises: respectively searching for N vibration signals corresponding to the music parameters of the N segment of the ringtone according to the music parameters of the N segments of the ringtone; and wherein the at least one processor is caused by the instructions stored in the memory to perform the generating a driving signal matching the ringtone according to the found vibration signal, which specifically comprises: combining the found N vibration signals to generate the driving signal matching the ringtone.

6. The mobile terminal according to claim 5, wherein the at least one processor is caused by the instructions stored in the memory to perform the combining the found N vibration signals to generate the driving signal matching the ringtone, which specifically comprises:
- acquiring play time points of the N vibration signals; and
- combining the found N vibration signals according to the play time points of the N vibration signals to generate the driving signal matching the ringtone.

7. The mobile terminal according to claim 5, wherein the musical parameters comprise at least a music beat and a music speed; and
- wherein the at least one processor is caused by the instructions stored in the memory to perform the searching for a vibration signal corresponding to the music parameter according to the music parameter of the ringtone, which specifically comprises:
- acquiring strength parameters of the vibration signal corresponding to the ringtone according to the music beat, wherein the strength parameters comprise a vibration time length and/or a vibration amplitude;
- acquiring a signal interval of the vibration signal corresponding to the ringtone according to the music speed; and
- searching for the vibration signal corresponding to the music parameter according to the strength parameter and the signal interval.

8. The mobile terminal according to claim 7, wherein the at least one processor is caused by the instructions stored in the memory to perform the acquiring strength parameters of the vibration signal corresponding to the ringtone according to the music beat, which specifically comprises: acquiring sound signal strengths of the ringtone at different moments according to the music beat; and acquiring the strength parameters of the vibration signal according to the sound signal strengths; and
- wherein the at least one processor is caused by the instructions stored in the memory to perform the acquiring a signal interval of the vibration signal corresponding to the ringtone according to the music speed, which specifically comprises: acquiring signal intervals corresponding to the ringtone at different moments according to the music speed.

9. The mobile terminal according to claim 5, wherein the ringtone is specifically an incoming call ringtone;
- wherein the at least one processor is caused by the instructions stored in the memory to further perform after detecting that the incoming call ringtone is changed, generating a new driving signal matching the changed incoming call ringtone;
- wherein the driving the motor to vibrate according to the generated driving signal is specifically: driving the motor to vibrate according to the new driving signal.

* * * * *